(12) United States Patent  (10) Patent No.: US 7,505,613 B2
Russo  (45) Date of Patent: Mar. 17, 2009

(54) SYSTEM FOR AND METHOD OF SECURING FINGERPRINT BIOMETRIC SYSTEMS AGAINST FAKE-FINGER SPOOFING

(75) Inventor: Anthony Russo, New York, NY (US)

(73) Assignee: Atrua Technologies, Inc., Campbell, CA (US)

( * ) Notice: Subject to any disclaimer, the term of this patent is extended or adjusted under 35 U.S.C. 154(b) by 69 days.

(21) Appl. No.: 11/484,381

(22) Filed: Jul. 10, 2006

(65) Prior Publication Data

US 2007/0014443 A1  Jan. 18, 2007

Related U.S. Application Data

(60) Provisional application No. 60/698,769, filed on Jul. 12, 2005.

(51) Int. Cl.
*G06K 9/00* (2006.01)

(52) U.S. Cl. .................. 382/124; 382/125; 340/5.53; 340/5.83

(58) Field of Classification Search .......... 382/124, 382/125; 340/5.53, 5.83; 713/186
See application file for complete search history.

(56) References Cited

U.S. PATENT DOCUMENTS

| | | | |
|---|---|---|---|
| 4,827,527 A | 5/1989 | Morita et al. .................. 382/4 |
| 5,610,993 A | 3/1997 | Yamamoto .................. 382/124 |
| 5,612,719 A | 3/1997 | Beernink et al. ............. 345/173 |
| 5,821,930 A | 10/1998 | Hansen ....................... 345/340 |
| 5,825,352 A | 10/1998 | Bisset et al. ................ 345/173 |
| 5,825,907 A | 10/1998 | Russo ........................ 382/124 |
| 5,862,248 A | 1/1999 | Salatino et al. ............. 382/124 |
| 5,880,411 A | 3/1999 | Gillespie et al. ........ 178/18.01 |
| 5,907,327 A | 5/1999 | Ogura et al. ................ 345/339 |
| 5,909,211 A | 6/1999 | Combs et al. ............... 345/172 |
| 5,940,526 A | 8/1999 | Setlak et al. ................ 382/124 |
| 5,943,052 A | 8/1999 | Allen et al. ................. 345/341 |
| 5,963,679 A | 10/1999 | Setlak ........................ 382/312 |
| 5,995,084 A | 11/1999 | Chan et al. ................. 345/173 |
| 6,057,830 A | 5/2000 | Chan et al. ................. 345/157 |
| 6,061,051 A | 5/2000 | Chan et al. ................. 345/173 |
| 6,135,958 A | 10/2000 | Mikula-Curtis et al. ..... 600/443 |

(Continued)

OTHER PUBLICATIONS

Robert K. Rowe, "Sensors—A Multispectral Sensor for Fingerprint Spoof Detection", Jan. 1, 2005, and pp. 1-4.

(Continued)

*Primary Examiner*—John B Strege
(74) *Attorney, Agent, or Firm*—Haverstock & Owens LLP (57) ABSTRACT

A biometric secured system grants a user access to a host system by classifying a fingerprint used to verify or authorize the user to the system as real or fake. The classification is based on a probability that fingerprint image data corresponds to characteristics that reliably identify the finger as real. The system includes a fingerprint sensor for capturing fingerprint image data coupled to a spoof detection module. In one embodiment, the spoof detection module is programmed to determine spoof probability based on a combination of metrics that include, among other metrics, pixel gray level average and the variance of pixels corresponding to a fingerprint ridge, pixel gray level average and the variance of pixels corresponding to a fingerprint valley, density of sweat pores, and density of sweat streaks, to name a few metrics.

38 Claims, 7 Drawing Sheets

U.S. PATENT DOCUMENTS

| | | | |
|---|---|---|---|
| 6,208,329 B1 | 3/2001 | Ballare | 345/173 |
| 6,248,655 B1 | 6/2001 | Machida et al. | 438/597 |
| 6,259,804 B1 | 7/2001 | Setlak et al. | 382/124 |
| 6,278,443 B1 | 8/2001 | Amro et al. | 345/173 |
| 6,323,846 B1 | 11/2001 | Westerman et al. | 345/173 |
| 6,330,345 B1 | 12/2001 | Russo et al. | 382/115 |
| 6,404,900 B1 | 6/2002 | Qian et al. | 382/103 |
| 6,408,087 B1 | 6/2002 | Kramer | 385/124 |
| 6,518,560 B1 | 2/2003 | Yeh et al. | 250/214 |
| 6,535,622 B1 | 3/2003 | Russo et al. | 382/124 |
| 6,545,614 B1 | 4/2003 | Kasai | 341/33 |
| 6,546,122 B1 | 4/2003 | Russo | 382/125 |
| 6,563,101 B1 | 5/2003 | Tullis | 250/208.1 |
| 6,661,631 B1 | 12/2003 | Sabatini et al. | 361/93.1 |
| 6,667,439 B2 | 12/2003 | Salatino et al. | 174/52.1 |
| 6,668,072 B1 | 12/2003 | Hribernig et al. | 382/124 |
| 6,681,034 B1 | 1/2004 | Russo | 382/125 |
| 6,744,910 B1 | 6/2004 | McClurg et al. | 382/124 |
| 6,754,365 B1 | 6/2004 | Wen et al. | 382/100 |
| 6,876,756 B1 | 4/2005 | Vieweg | 382/124 |
| 6,961,452 B2 | 11/2005 | Fujii | 382/125 |
| 7,002,553 B2 | 2/2006 | Shkolnikov | 345/169 |
| 7,003,670 B2 | 2/2006 | Heaven et al. | 713/186 |
| 7,020,270 B1 | 3/2006 | Ghassabian | 379/368 |
| 7,054,470 B2 | 5/2006 | Bolle et al. | 382/124 |
| 7,136,514 B1 | 11/2006 | Wong | 382/124 |
| 7,197,168 B2 | 3/2007 | Russo | 382/125 |
| 7,263,212 B2 | 8/2007 | Kawabe | 382/124 |
| 7,280,679 B2 | 10/2007 | Russo | 382/124 |
| 7,299,360 B2 | 11/2007 | Russo | 713/182 |
| 7,369,688 B2 | 5/2008 | Ser et al. | 382/124 |
| 2001/0017934 A1 | 8/2001 | Paloniemi et al. | 382/107 |
| 2002/0130673 A1 | 9/2002 | Pelrine et al. | 324/727 |
| 2002/0186203 A1 | 12/2002 | Huang | 345/157 |
| 2002/0188854 A1 | 12/2002 | Heaven et al. | 713/186 |
| 2003/0002718 A1 | 1/2003 | Hamid | 382/124 |
| 2003/0021495 A1 | 1/2003 | Cheng | 382/312 |
| 2003/0028811 A1 | 2/2003 | Walker et al. | 713/202 |
| 2003/0044051 A1 | 3/2003 | Fujieda | 382/124 |
| 2003/0115490 A1 | 6/2003 | Russo et al. | 713/202 |
| 2003/0123714 A1 | 7/2003 | O'Gorman et al. | 382/124 |
| 2003/0126448 A1 | 7/2003 | Russo | 713/186 |
| 2003/0135764 A1 | 7/2003 | Lu | 713/202 |
| 2003/0214481 A1 | 11/2003 | Xiong | 345/157 |
| 2004/0014457 A1 | 1/2004 | Stevens | 455/414.1 |
| 2004/0128521 A1 | 7/2004 | Russo | 713/186 |
| 2004/0148526 A1 | 7/2004 | Sands et al. | 713/202 |
| 2004/0156538 A1 | 8/2004 | Greschitz et al. | 382/124 |
| 2004/0186882 A1 | 9/2004 | Ting | 709/202 |
| 2004/0208348 A1 | 10/2004 | Baharav et al. | 382/124 |
| 2004/0252867 A1 | 12/2004 | Lan et al. | 382/124 |
| 2004/0258282 A1 | 12/2004 | Bjorn et al. | 382/124 |
| 2004/0263479 A1 | 12/2004 | Shkolnikov | 345/169 |
| 2005/0012714 A1 | 1/2005 | Russo et al. | 345/157 |
| 2005/0041885 A1 | 2/2005 | Russo | 382/289 |
| 2005/0169503 A1 | 8/2005 | Howell et al. | 382/115 |
| 2005/0179657 A1 | 8/2005 | Russo et al. | 345/163 |
| 2005/0259851 A1 | 11/2005 | Fyke | 382/124 |
| 2005/0259852 A1 | 11/2005 | Russo | 382/124 |
| 2006/0002597 A1 | 1/2006 | Rowe | 382/124 |
| 2006/0034043 A1 | 2/2006 | Hisano et al. | 361/681 |
| 2006/0078174 A1 | 4/2006 | Russo | 382/121 |
| 2006/0103633 A1 | 5/2006 | Gioeli | 345/173 |
| 2006/0242268 A1 | 10/2006 | Omernick et al. | 709/219 |
| 2006/0280346 A1 | 12/2006 | Machida | 382/124 |
| 2007/0034783 A1 | 2/2007 | Eliasson et al. | 250/221 |
| 2007/0061126 A1 | 3/2007 | Russo et al. | 703/24 |
| 2007/0125937 A1 | 6/2007 | Eliasson et al. | 250/221 |
| 2007/0274575 A1 | 11/2007 | Russo | 382/124 |
| 2008/0013808 A1 | 1/2008 | Russo | 382/124 |

OTHER PUBLICATIONS

Robert K. Rowe et al., "Fingerprint Spoof Detection using Multispectral Imaging", and Sep. 21, 2004.

Tsutomu Matsumoto et al., "Impact of Artificial "Gummy" Fingers on Fingerprint System", Jan. 24-25, 2002, and pp. 1-11.

Reza Derakhshani, "Spoof-Proofing Fingerprint Systems Using Evolutionary Time-Delay Neural Networks", Mar. 31-Apr. 1, 2005, and Orlando, FL.

Davide Maltoni et al., "Handbook of Fingerprint Recognition", 2003 and pp. 286-331.

Marie Sandström, "Liveness Detection in Fingerprint Recognition Systems", 2004, and pp. 1-128.

"*Fingernail Touch Sensors: Spatially Distributed Measurement and Hemodynamic Modeling*", Stephen Mascaro and H. Harry Asada, 2000 IEEE, pp. 3422-3427.

Ballard and Brown, "*Computer Vision*", Prentice Hall, 1982, pp. 66-69.

Jacob O. Wobbrock, Brad A. Myers, Htet Htet Aung, and Edmond F. LoPresti, Text Entry from Power Wheelchairs: Edge Write for Joysticks and Touchpads, pp. 110-117, Human-Computer Interaction Institute School of Computer Science Carnegie Mellon University, Pittsburg, PA 15213 USA.

Choonwoo Ryu et al. "Super-template Generation Using Successive Bayesian Estimation for Fingerprint Enrollment", Springer-Verlag Berlin Heidelberg, pp. 710-719.

Dongjae Lee et al. "Fingerprint Fusion Based on Minutiae and Ridge for Enrollment", 2003 Springer-Verlag Berlin Heidelberg, pp. 478-485.

Koichi Sasakawa et al. "Personal Verification System with High Tolerance of Poor Quality Fingerprints", 1990 Machine Vision Systems Integration in Industry, pp. 265272.

Michal Irani et al. "Improving Resolution by Image Registration", 1991 by Academic Press, Inc. pp. 231-239.

Qinfen Zheng et al. "A Computational Vision Approach to Image Registration", 1992 IEEE, pp. 193-197.

Wei-Yun Yau et al. "Fingerprint Templates Combination", 2004 Springer-Verlag Berlin Heidelberg, pp. 449-460.

Xudong Jiand et al. "Detecting the Fingerprint Minutiae by Adaptive Tracing the Gray-Level Ridge", 2001, pp. 999-1013, Published by Elsevier Science Ltd.

Xudong Jiang et al. "Fingerprint Minutiae Matching Based on the Local and Global Structures", 2000 Ieee, pp. 1038-1041.

SYSTEM FOR AND METHOD OF SECURING FINGERPRINT BIOMETRIC SYSTEMS AGAINST FAKE-FINGER SPOOFING

RELATED APPLICATION

This application claims priority under 35 U.S.C. § 119(e) of the U.S. provisional patent application Ser. No. 60/698,769, filed Jul. 12, 2005, and titled "Methods for Protecting Fingerprint Biometric Systems from Fake-finger Spoofing," which is hereby incorporated by reference.

FIELD OF THE INVENTION

This invention relates to fingerprint systems. More specifically, this invention relates to systems for and methods of preventing unauthorized users from fooling a fingerprint authentication or verification system by using replicas of an enrolled finger formed from synthetic materials such as gelatin, silicone, and Play-Doh®.

BACKGROUND OF THE INVENTION

Spoofing in the context of secure fingerprint systems is the act of using a fake finger—typically one made of gelatin, silicone, or Play-Doh®—to gain illicit access to services protected by a biometric system. "Fake finger" refers to any non-human apparatus designed to fool the fingerprint system. "Spoofing" is the act of using a fake finger to gain illicit access. "Vitality detection" or "live finger detection" refers to the ability of a system to distinguish between live human fingers and non-living real or fake fingers.

Prior art literature states that it is easy to make molds of latent fingerprints left behind by legitimate users. While inexperienced persons may still have some difficulty creating fake fingers from latent prints, the process has definitely gotten easier and more accessible over the past few years. Therefore, the security of these systems is jeopardized, and it is becoming necessary to offer some protection against this threat in the form of "anti-spoofing" methods.

Some prior art anti-spoofing systems use methods to determine the vitality of a finger presented to a fingerprint sensor. Most of these systems are hardware-based, resulting in significantly higher costs, as well as a significantly larger sensor. These larger sensors are unacceptable for mobile devices, which typically require a very small sensor size. The prior art generally teaches, among other things, using characteristics of a finger such as finger surface resistance, temperature, pulse, and blood oximetry.

None of these prior art systems are known to work very well. In a typical system, a parameter such as surface resistance is measured by hardware, and then logic (hardware or software based) simply checks to make sure the sensed value is within an acceptable range. This can be repeated for a plurality of metrics, with all the metrics treated independently.

Prior art software-based solutions are not adaptable to swipe-type fingerprint sensors. Specifically, these systems require that successive full-size images of a finger be analyzed to merely determine whether the finger is sweating. This process takes many seconds to complete, at the user's inconvenience.

SUMMARY OF THE INVENTION

In a first aspect of the present invention, a biometric secured system includes a fingerprint sensor for capturing fingerprint image data coupled to a spoof detection module. The spoof detection module contains logic programmed to determine a spoof probability from a combination of metrics derived from the fingerprint image data. In different embodiments, the spoof detection module is programmed using software, firmware, hardware, other means for executing instructions to determine a probability, and any combination of these. In one embodiment, the spoof detection module includes a metric generator for generating the metrics and classifier logic for generating from the metrics a raw probability that the fingerprint image data was generated from a synthetic material.

The combination of metrics includes any two or more of pixel gray level average and variance of pixels corresponding to a fingerprint ridge, pixel gray level average and variance of pixels corresponding to a fingerprint valley, density of sweat pores, density of streaks, and raw signal level, as well as values corresponding to ridge elasticity of a finger, electrical properties of a finger, optical properties of a finger, and vitality properties of a finger.

Preferably, the spoof detection module also includes adjustor logic for adjusting the raw probability by a base probability to generate the spoof probability. The base probability is generated from stored metrics based on fingerprint image data captured during an enrollment step.

In one embodiment, the spoof detection module also includes a filter for dividing the fingerprint image data into multiple windows. In this embodiment, the classifier logic is also programmed to determine the spoof probability based on a comparison of the values of the metric in each of the multiple windows. Preferably, dimensions of the multiple windows are programmable. In this way, the effectiveness of the system to predict whether a finger is real can be tested for different combinations of dimensions and the dimensions that best predict the existence of streaks and other characteristics in accordance with the present invention can be selected. Also, preferably, the classifier logic includes a neural network for learning to generate the raw probability from the set of metrics.

Preferably, the fingerprint sensor is a swipe sensor. Alternatively, the fingerprint is a placement sensor or any other kind of sensor for capturing fingerprint image data.

The system also includes an access module coupled to a host system. The access module is programmed to grant access to a host system when the spoof probability is within a predetermined range, such as above a predetermined threshold value or below a different predetermined threshold value. The host system can be any one of a cell phone, a personal digital assistant, a digital camera, and a personal computer, to name only a few host systems. In one embodiment, the access module, the host system, the fingerprint sensor, and the anti-spoof module are integrated onto a single platform.

The system also includes storage for storing the stored metrics. The storage is coupled to the spoof detection module over a network, such as a local area network or a wide area network such as the Internet. In one embodiment, the stored metrics are encrypted. In other embodiments, fingerprint image data, from which the metrics are generated, are encrypted.

In a second aspect of the present invention, a spoof detection module includes a metric calculator coupled to classifier logic. The metric calculator is programmed to calculate multiple metrics from fingerprint image data. The classifier logic is programmed to receive the multiple metrics and determine a spoof probability based on the combination of the multiple metrics.

In a third aspect of the present invention, a method of determining the similarity of a finger to human skin tissue includes capturing fingerprint image data and determining a spoof probability that the finger is real. The probability is based on a combination of metrics derived from the fingerprint image data. The combination of metrics includes any two or more of pixel gray level average and variance of pixels corresponding to a fingerprint ridge, pixel gray level average and variance of pixels corresponding to a fingerprint valley, density of sweat pores, density of streaks, and raw signal level, and values corresponding to ridge elasticity of a finger, electrical properties of a finger, optical properties of a finger, and vitality properties of a finger.

DETAILED DESCRIPTION OF THE PREFERRED EMBODIMENT

The present invention is directed to systems for and methods of determining whether a fingerprint used to verify or authenticate a user to a host system is "real or human," or whether the fingerprint is a fake used to spoof the host system. Systems in accordance with the present invention determine the likelihood or probability that fingerprint image data captured by a fingerprint sensor used to secure the host system corresponds to a real image. The probability is considered high if the fingerprint image data is determined to correspond to characteristics of fingerprints that are reliable indicators that the fingerprint is real or human. The fingerprint is thus said to be "classified" as real.

On example of a reliable indicator is liquid discharge from the sweat pores, also called "streaks," during a finger swipe across a fingerprint swipe sensor. It is believed that streaks are difficult to imitate using a non-real finger. Advantageously, data indicating streaks can be acquired using a single acquisition. Other examples of reliable indicators include, but are not limited to, metrics that indicate pixel grey level averages and the variance of pixels corresponding to a fingerprint ridge, and similar statistics corresponding to a fingerprint valley. The combination of metrics can, but not necessarily does, include a metric that corresponds to streaks, and taken together reliably indicate whether a finger is real or fake.

In a preferred embodiment, the present invention employs software-based methods and combinations of hardware- and software-based methods applicable to fingerprint swipe sensors. The process for capturing fingerprint image data typically takes only a fraction of a second, a much shorter time than that taken by some software-based methods and also by some hardware-based methods like pulse detection, all of which require more time to reliably capture and collect fingerprint image data. Because fingerprint swipe sensors occupy the low-cost segment of finger imaging devices, systems that use them are relatively low-cost and have a small footprint, typically smaller than 25 mm$^2$.

Systems in accordance with the present invention, which include an anti-spoofing system that includes spoof detection logic, combine fingerprint swipe sensor hardware capabilities with software analysis. Therefore, the only required hardware is the sensor itself, reducing both the cost and the form factor. In some embodiments, the software algorithms are designed to operate with only a single finger swipe, making the data capture process fast and transparent to the user.

As used herein, the term metric includes, but is not limited to, a value that indicates a property of a characteristic. As one example, the characteristic is the elasticity of a fingerprint ridge. When the characteristic has the value (metric) 1, this indicates that the fingerprint ridge has a high elasticity and when the characteristic has the value 0, this indicates low elasticity. Alternatively, the value 0 can indicate high elasticity and the value 1, low elasticity. Methods in accordance with the present invention consider combinations of metrics, some of which can be based on interdependent characteristics, to reliably predict whether a finger is (e.g., "classify" a finger as) real or fake.

In accordance with the present invention, sensed metrics are treated as a whole, rather than as separate entities that may or may not be within a specified range. Because some metrics may be correlated either directly or to external environmental conditions such as relative humidity, it is advantageous to design the classification logic—the logic used to determine whether a fingerprint image is captured from a real or human finger—to take these complexities into account.

During the verification or authentication process, stored enrollment data are compared to data captured during verification to adjust the probability of a spoof. Unlike prior art systems, which may use enrolled values to narrow or widen the acceptable ranges of some parameters during subsequent spoof detection, embodiments of the present invention specifically adjust the probability based on a finger's tendency to appear fake to the system. This helps reduce the chances that real fingers will be falsely labeled fake by the system, thereby inconveniencing the user much less often.

Figure 1:
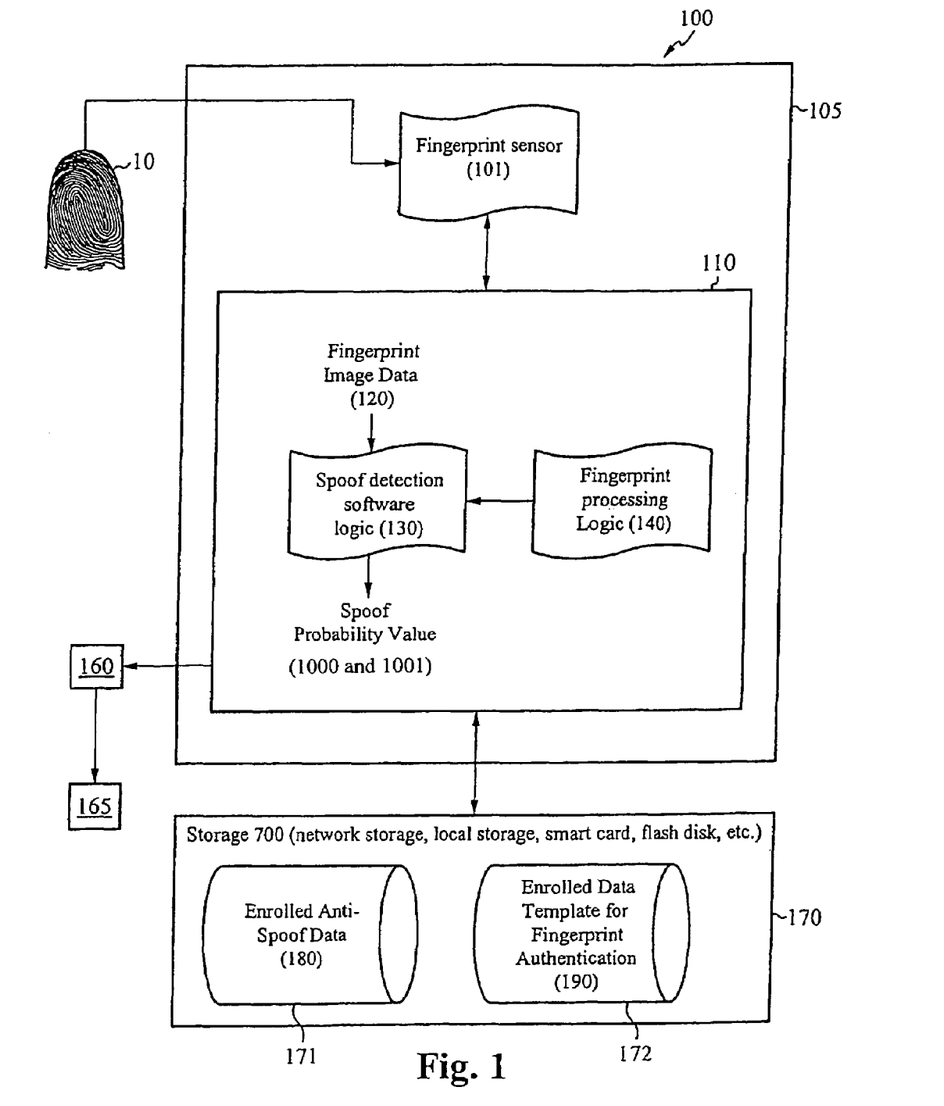
FIG. 1 is a block diagram of a secure fingerprint system in accordance with the present invention.

FIG. 1 shows an anti-spoofing system 100 in accordance with one embodiment of the present invention, used as part of a larger secure fingerprint recognition system. The anti-spoofing system 100 comprises a fingerprint sensor 101 coupled to an anti-spoof module 110, collectively a module 105. The anti-spoof module 110 is coupled to both a storage module 170 and an access module 160. As described below, the storage module 170 includes storage 171 for containing enrolled anti-spoof data 180 and storage 172 for containing enrolled data templates 190 for fingerprint authentication. The access module 160 is coupled to a host system 165, to which a user ultimately seeks access.

In operation, a user swipes his finger on the fingerprint sensor 101 as a step to gain access to the host system 165. Fingerprint image data 120 generated from the fingerprint sensor 101 together with corresponding enrolled anti-spoof data 180 in the storage 170 are used by the anti-spoof module 110 to calculate a probability that the finger is human (e.g., real). Enrolled template data 190 in the storage are used to authenticate the user. The access module 160 grants the user access to the host system 165 only if (1) the calculated probability is within a predetermined range, that is, it is likely, with a predetermined degree of confidence, that the finger is real; and (2) the user is authenticated, that is, the real finger belongs to an authorized user. Preferably, the module 105, the access module 160, and the host system 165 form a single integrated system, such as a cell phone or a digital camera.

The anti-spoof module 110 comprises logic for executing spoof detection software logic 130 and fingerprint processing logic 140. As used herein, logic refers to any combination of memory or storage for storing computer instructions (e.g., algorithms), the computer instructions themselves (software), a processor for executing those instructions, specialized hardware including application specific integrated circuits, or any other means for executing the instructions. As explained in more detail below, the logic 130 generates spoof probability values 1000 and 1001, that is, probabilities used to determine the likelihood that an object 10 (also referred to as a stimulus 10) swiped or placed on the fingerprint sensor 101 is real. The stimulus 10 can be real human skin or a fake finger with ridge-like texture. Also, as described below, the storage module 170 contains enrolled anti-spoof data 180 for adjusting a spoof probability and an enrolled data template 190 for fingerprint authentication, both described in more detail below.

In the preferred embodiment, the fingerprint sensor 101 is an Atrua ATW202 capacitive swipe sensor, from Atrua Technologies, Inc., Campbell, Calif. Other swipe sensors can also be used. In other embodiments the fingerprint sensor is (1) a full-size placement type, (2) one that uses alternative sensing means such as optical, E-Field, or thermal, or (3) any combination of these. It will be appreciated that thermal sensors may not be capable of detecting streaks due to pore leakage during the swipe process.

Those skilled in the art will recognize that the fingerprint image data 120 can refer to a reconstructed image (if the fingerprint sensor 101 is a swipe sensor) or parts thereof, and can include, but is not limited to, other non-image information such as timestamps, finger surface resistance, and gain control settings, as long as the fingerprint sensor 101 is capable of measuring that information. The preferred embodiment operates on 20-row portions of the reconstructed image and hence never has the entire reconstructed image in memory. Systems for and methods of dividing and later reconstructing a fingerprint image are taught in U.S. Patent Application Publication No. U.S. 2005/0259852, filed Sep. 21, 2004, and titled "Secure System and Method of Creating and Processing Partial Finger Images," which is hereby incorporated by reference. Alternative embodiments use the entire reconstructed image, as would be done if a full-size placement sensor were used. Yet another alternative embodiment analyzes the raw image frames sent by the sensor (typically 8-16 rows of image data) and does no reconstruction at all.

The antispoof module 110 includes application software that executes on the module (e.g., host computing platform) 105 and controls the acquisition and processing of data and provides the interface to the user. This application software, for example, prompts the user when to enroll and/or verify his fingers, and initiates the processing of the data and communication with any of the host's peripherals or remote network clients. As one example, on a mobile handset e-commerce application, the software is a java applet that communicates over-the-air to a transaction server to verify a buyer's identity and also to confirm that the images are from a human finger. Other types of applications include those granting or denying access to services and/or physical locations and/or data.

When software forms part of the logic of the present invention, the software can be executed on any number and combination of hosts. Similarly, the data used by the software can be stored at any number and combination of locations. As one example, the access module 160 and module 165 are integrated with the host computing platform 105. The logic (here, software algorithms) 130 and 140 are executed on the host processor 105 such as a cell phone, personal computer, or embedded system, and the storage 170 is either local or remotely accessed through a network. As some examples, the network is a local area network or a wide area network such as the Internet. In the preferred embodiment, the spoof detection logic 130 is integrated into the fingerprint processing logic 140, but it is possible to have both exist as separate entities and to be run on different host processors, or combinations thereof. As one example, the spoof detection logic 130 runs on the cell phone integrated with the finger image sensor 101, and the fingerprint processing logic 140 runs on a remote server. As another example, both the spoof detection logic 130 and the fingerprint processing logic 140 run on a remote platform, such as when a Bluetooth network or USB controller is used to connect the fingerprint sensor 101 to a host computing platform.

The data 180 and 190 can also be stored in encrypted form in alternative embodiments. The storage can be one or more of the following media: hard disk drive, optical drive, FLASH storage, Read Only Memory, Random Access Memory, or smart card, to name only a few media. In the preferred embodiment, the enrolled anti-spoof data 180 is stored in the same physical storage unit as the template data 190 and is concatenated into the same file. Those skilled in the art will appreciate that many different storage options and formats exist.

Figure 2:
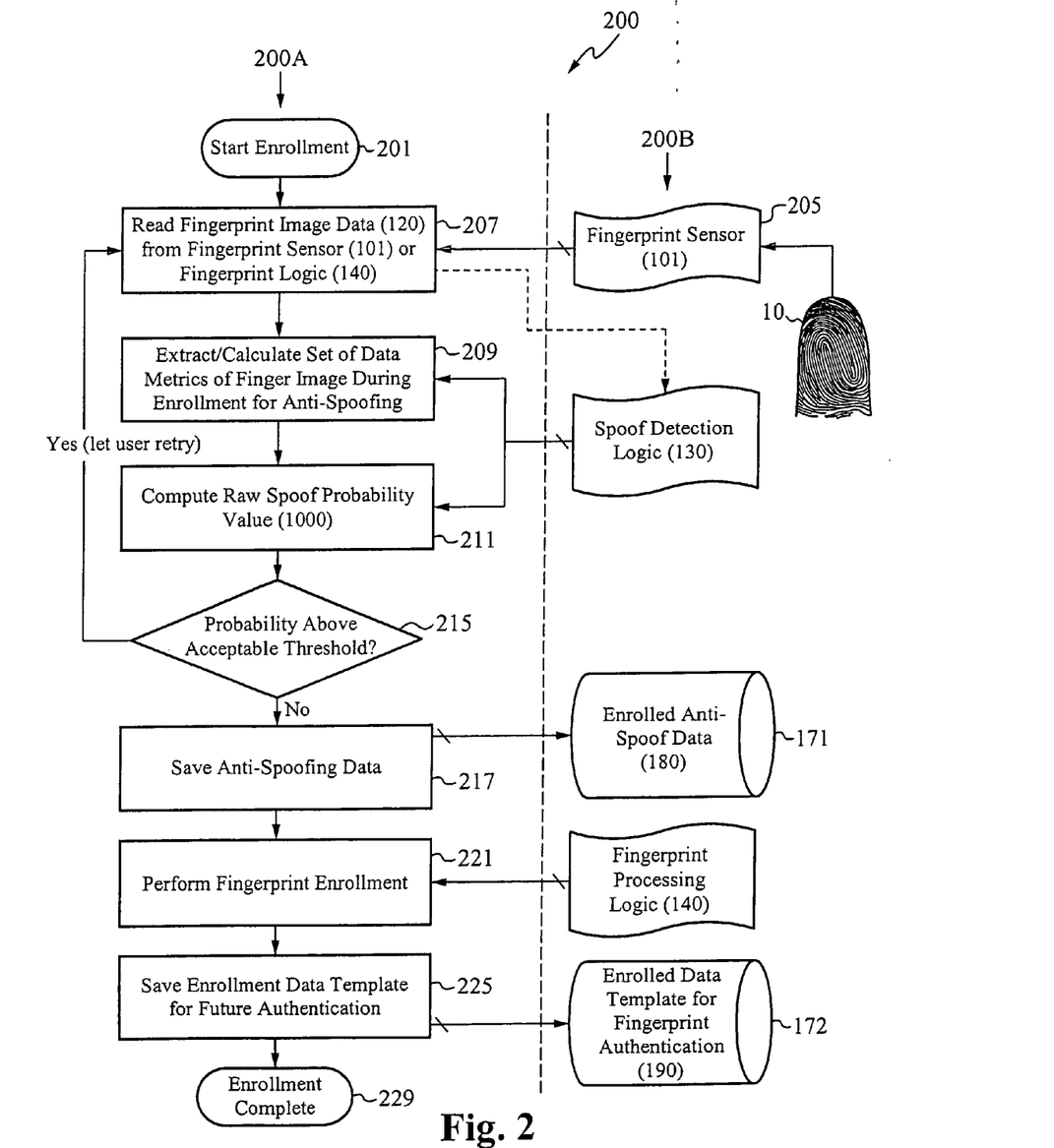
FIG. 2 shows the steps of an enrollment process using spoof detection algorithms in accordance with the present invention and the corresponding input, data, and algorithms.

FIG. 2 is an augmented flowchart 200 showing the steps of a process for enrolling fingerprint image data using the antispoofing system 100 of FIG. 1, in accordance with the present invention. The augmented flow chart 200 has a left-hand column 200A showing the steps of the process and a right-hand column 200B showing the algorithms, data, and hardware for performing the steps. In the discussion that follows, reference numerals refer to the steps shown in FIG. 2 and the corresponding components of FIG. 1.

Referring to FIG. 2, the process starts in the Start Enrollment step 201. The user is able to select the step 201 from an interface when initializing or updating the antispoofing system 100. Next, in the step 207, the process reads the fingerprint image data 120. As shown in the column 200B, the fingerprint image data 120 is captured by the fingerprint sensor 101 when the stimulus 10 is swiped or placed on it. The fingerprint sensor 101 then, either directly or through the fingerprint detection logic 140, passes the image data to the spoof detection logic 130, illustrated by the dotted line connecting the step 207 to the spoof detection logic 130.

Next, in the step 209, a set of data metrics of the fingerprint image data is extracted or otherwise calculated. In the step 211, a "raw" spoof probability 1000 is calculated from the set of data metrics. (As explained below, in some embodiments, the probability that the stimulus is real is adjusted. The unadjusted probability is referred to as the "raw" probability to distinguish it from the adjusted probability.) The raw spoof probability 1000 is tested in the step 215 and, if it is above an acceptable threshold, indicating a strong possibility that the finger is fake, the process loops back to the step 207, thereby allowing the user to again swipe or otherwise place his finger on the fingerprint sensor 101. Otherwise, the process continues to the step 217, where the antispoofing data 180 is saved in the storage 171 (column 200B) for future reference during fingerprint verification. After the step 217, the process continues to the step 221, where the fingerprint (i.e., the fingerprint image data) is enrolled using the fingerprint processing logic 140 (column 200B). Next, in the step 225, the enrollment data template 190 is stored for future authentication in the storage 172 (column 200B). The process then continues to the step 229, where the enrollment completes.

While the preferred embodiment shown in FIG. 2 tests whether the stimulus 10 used during the enrollment process is real, other embodiments do not. In these other embodiments, during the enrollment process, the stimulus 10 is assumed to be a real finger. In these other embodiments, the steps 211 and 215 are not performed.

Those skilled in the art will also recognize that other modifications can be made to the embodiment shown in FIG. 2. For example, rather than computing and later testing a raw spoof probability 1000 in the steps 211 and 215, a non-linear metric, such as one that takes on only true/false values (e.g., 1/0 or 0/1) is calculated and later tested.

Still referring to FIG. 2, in accordance with other embodiments, rather than loop from the step 215 to the step 207 if the probability that the imaged finger is fake is above a given threshold—a value typically specified by the application software—the user is notified. In the preferred embodiment, during enrollment the user is permitted to enroll anyway after being warned (that is, he or she is trusted). Depending on the type of application, alternative embodiments cancel the enrollment, or tentatively accept it for low-value transactions until subsequent credentials are supplied. Depending on the level of security required by the application, the probability threshold can range anywhere from 0% to 100% (i.e., a metric from 0 to 1). In the preferred embodiment 55% is used. In other words, the imaged finger is deemed fake if the raw spoof probability is in the predetermined range 0.55 to 1.0. Of course, other predetermined ranges can also be used.

While FIG. 2 shows that a stimulus is classified as "fake" if a probability computed from a metric or combination of metrics is "above" a threshold value, those skilled in the art will recognize that probabilities can be generated so that a stimulus is classified as fake if the probability is below a threshold value. As one example, the probability computed from a set of metrics is the value X. Classification logic determines that if X is 0.55 or larger (within the predetermined range [0.55, 1]), then the stimulus is classified as fake. Alternatively, if the probability computed is 1−X (the complement of X), then the stimulus is classified as fake if the calculated probability (1−X) is 0.45 or smaller (within the predetermined range [0,0.45]): generating the complement of the probability merely changes the range of values used to classify the stimulus. The resulting classification is the same.

In alternative embodiments, some or all of the functionality of the spoof detection logic 140 is implemented by the fingerprint sensor 101 itself. In this case, it is possible to prevent the fingerprint sensor 101 from imaging fingers likely to be fake. It is also possible to prevent the fingerprint sensor 101 from imaging for a period of time (such as a blackout period), or to effectively lock it until a password or other key is supplied. Furthermore, the metrics can be sent to the host as part of the fingerprint image data and saved along with the other properties, if any, for subsequent use during verification.

Figure 3:
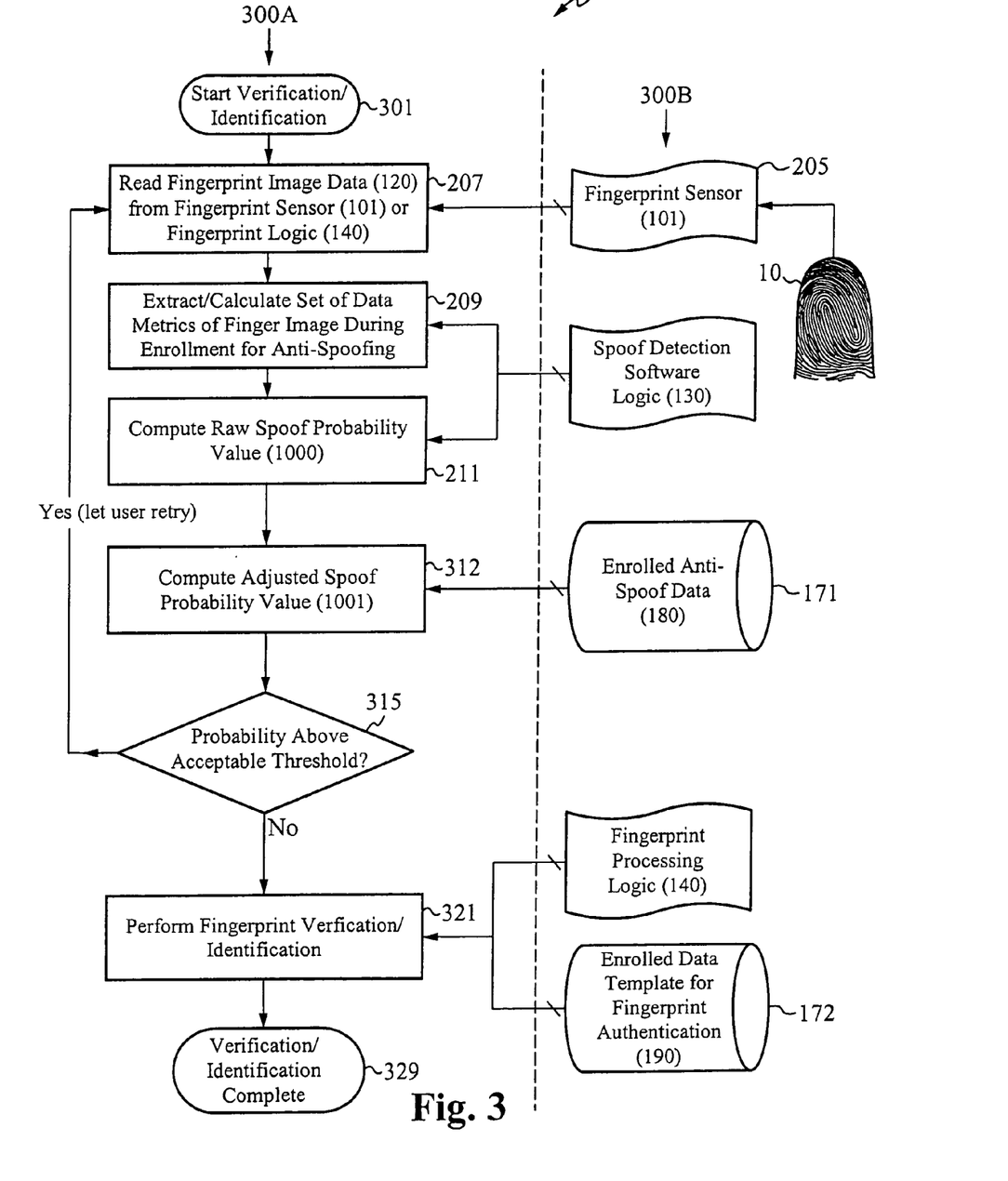
FIG. 3 shows the steps of verifying/identifying a fingerprint using spoof detection in accordance with the present invention.

FIG. 3 is an augmented flowchart 300 showing the steps of a process that can be used for verification, identification, or both, using the antispoofing system of FIG. 1. The augmented flowchart 300 has a left-hand column 300A showing the steps of the process and a right-hand column 300B showing the algorithms, data, and hardware for performing the steps. Identically labeled steps and elements in FIGS. 1-3 refer to the same step or element. Because identification simply repeats the process of verification over a multitude of enrolled templates, in practice the anti-spoofing process for identification is essentially the same as for verification. In the discussion that follows, it is assumed that the process is used to identify a user by his fingerprint.

Referring to FIG. 3, the identification process begins in the step 301. Preferably, the step 301 occurs right before a user attempts to access a host system. The steps 207, 209, and 211 are the same as those described in FIG. 2. After the step 211, the process proceeds to the step 312, where an adjusted spoof probability 1001 is calculated by taking the raw spoof probability 1000 calculated in the step 211 and adjusting it using the enrolled antispoof data 180, calculated using the process shown in FIG. 2. Next, in the step 315, the process determines whether the adjusted spoof probability is above an acceptable threshold. If it is, the process loops back to the step 207; otherwise, the process continues to the step 321, where the fingerprint is verified using the fingerprint processing logic 140 and enrolled data template 190 (column 300B). The process then completes in the step 329.

Calculating an "adjusted spoof probability" increases the reliability of systems that use embodiments of the present invention. For example, in the preferred embodiment, if the enrolled finger has a calculated probability of X % of being a spoof, and the unadjusted ("raw") probability of a spoof during verification is calculated to be Y %, then the adjusted probability is Y %−X % if Y>X or 0% if Y<=X. In this way, enrolled fingers that are known to be real but tend to appear fake to the system will have a reduced chance of being labeled spoofs during verification. "False spoofs" are a problem for the user who is not trying to fool the system but is denied access anyway. Therefore, anti-spoofing systems must always balance the probability of missing an actual spoof (and reducing the security of the system) with the probability of calling a real finger fake (and inconveniencing the legitimate user).

Alternative embodiments eliminate the probability adjustment step entirely, effectively setting the adjusted probability (1001) equal to the raw probability value (1000); those skilled in the art will appreciate that it is possible to use more sophisticated means of calculating an adjusted probability during verification, including building this step into the classifier logic itself.

In the preferred embodiment, if the adjusted probability is greater than the probability threshold of the application—which may be different from the value used during enrollment—the finger is deemed (classified) to be real. In this case the normal fingerprint verification process can proceed and access can be granted if the fingerprint images (the captured image and the stored image) match. If, instead, the finger is deemed to be fake, the finger is rejected and the user is, for instance, asked to try again. In this case, fingerprint verification is blocked and no access is granted. Alternative embodiments lock out the user after some number of failed spoof attempts within a given time period, or adjust the spoof threshold upward or downward based on any previous history of failed spoof attempts.

In another embodiment, the spoof detection is performed after fingerprint verification is complete but before access is granted. In this case, if the scanned fingerprint image matches an enrolled fingerprint image, then the anti-spoofing comparison is made and access is only granted if both the fingerprint images match and the adjusted spoof probability (1001) is below a threshold value. This embodiment is most useful during identification to avoid a time-consuming database search.

Figure 4:
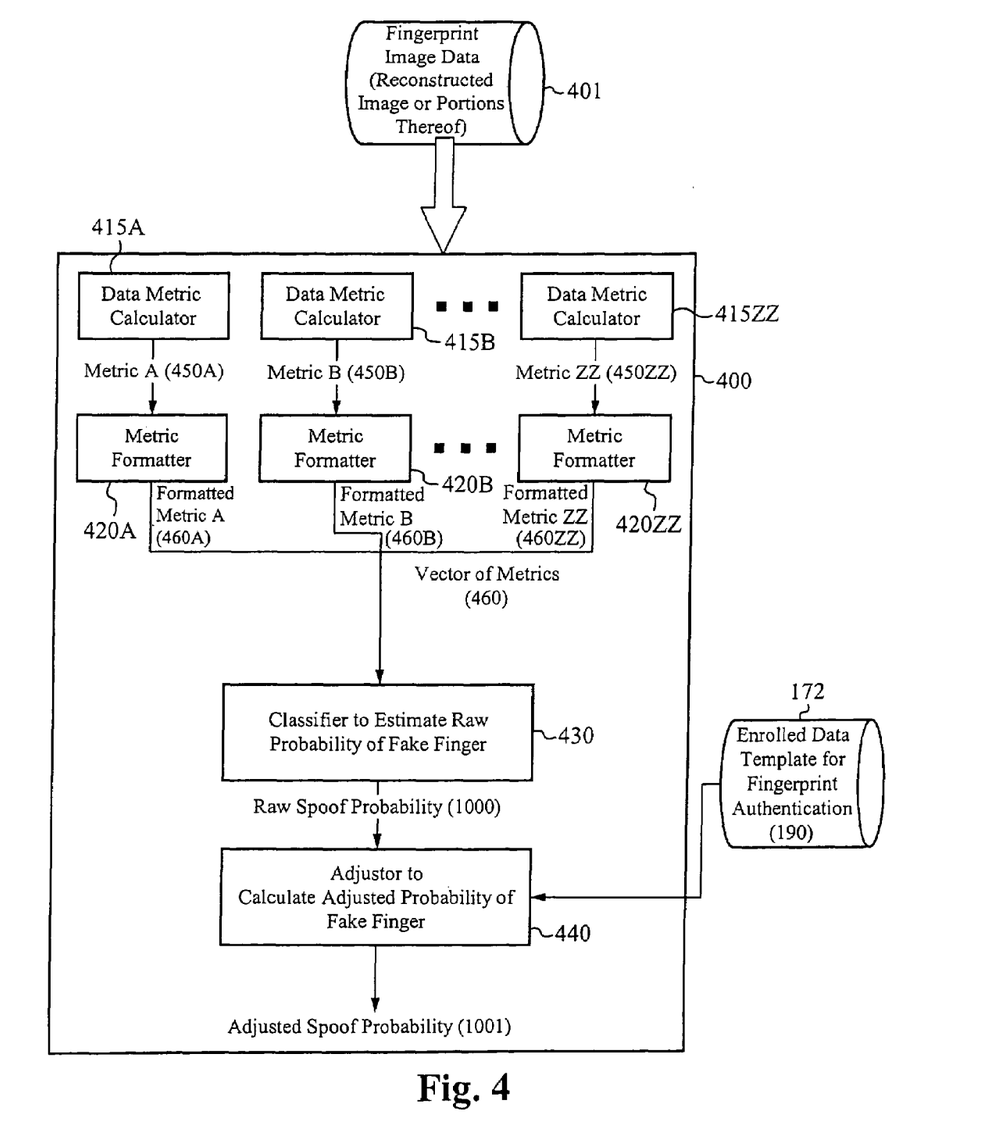
FIG. 4 is a block diagram of a spoof detection module in accordance with the present invention.

FIG. 4 shows a spoof detection module 400 for receiving fingerprint image data 401 and determining a probability that the fingerprint image data 401 corresponds to a real finger. The spoof detection module 400 comprises data metric calculators 415A-415ZZ, each for receiving the image data 401 from a fingerprint sensor and calculating a corresponding metric 450A-450ZZ, respectively. Each of the metric calculators 415A-415ZZ is coupled, respectively, to metric formatters 420A-420ZZ. Each of the metric formatters 420A-420ZZ is configured to receive a corresponding one of the metrics 450A-450ZZ, respectively, and to generate a corresponding formatted metric 460A-460ZZ. Together, the combination of formatted metrics 460A-460ZZ, form a formatted vector of metrics 460.

The output of each metric formatter 420A-420ZZ is coupled to classifier logic 430, which uses the vector of metrics 460 to generate a raw spoof probability (1000) used to classify an applied stimulus as real or fake. The classifier logic 470 is coupled to an adjustor 440, which is coupled to the storage 172. The adjustor 440 receives the raw spoof probability (1000) and uses it and the enrolled data template 172 to generate an adjusted spoof probability (1001).

A multitude of statistical metrics are calculated using the fingerprint image data 401 and any accompanying information such as automatic gain control settings and timestamps. The formatters 420A-420ZZ can format using any number of methods that make the classification process easier. These methods include, but are not limited to, normalization or any other type of transformation known to those skilled in the art.

In the preferred embodiment, the classifier logic 430 comprises a 3-layer feed-forward fully-connected neural network trained using standard back-propagation techniques well known to those skilled in the art. The neural network has one input neuron for each metric, a single hidden layer, and one output neuron. The raw probability (1000) is taken to be the output of this output neuron. In alternative embodiments, multiple output neurons exist, one for each possible outcome (e.g. real and fake). In yet another embodiment, an output neuron exists for each type of material the network was trained with (e.g. human, gelatin, gummy, Play-Doh®, silicone, etc.). In this embodiment, the raw probability (1000) is a combination of the values of each output neuron. It should be clear to anyone skilled in the art that other neural network architectures can be used, including additional hidden layers, varying input and hidden layer sizes, and different types of neural networks. It will also be appreciated that non-linear or piecewise-linear classification methods can be used in place of the neural network, as long as the input metrics are examined as a whole and not independently.

As one example, it is believed that for real fingers, certain metrics are correlated. For instance, it is determined that streak density and average grey level of ridges are correlated for real fingers: the lighter the average grey value, the less likely streaks will occur. Thus, if during a verification step classification logic determines that the average ridge value is very light, and there are very few streaks, the classifier logic will reduce the spoof probability because it is likely that the finger is real. If the streak metric were viewed separately, the classifier logic would likely have determined that the finger was more likely to be fake, since fake fingers do not streak. Therefore, the performance is improved by analyzing the two metrics together instead of separately.

In a preferred embodiment, data metrics used in accordance with the preferred embodiment include any combination of:

Pixel gray level average (450A, FIG. 4) and variance (450B) of the pixels that lie on a fingerprint ridge.

Pixel gray level average (e.g., 450C, not shown in FIG. 4) and variance (e.g., 450D, not shown) of the pixels that lie on a fingerprint valley.

Density of sweat pores (e.g., 450E, defined as detected number of pores per image row, not shown in FIG. 4). FIG. 5, discussed below, shows sweat pores.

Density of finger image "streaks" due to pores leaking sweat (450F, defined as number of pixels that lie on a streak per image row). FIG. 6 shows "streaks."

Raw signal level of the applied stimulus (e.g., 450G, not shown in FIG. 4). The preferred embodiment uses the median automatic gain control setting of the sensor during the duration of the finger swipe to represent this metric.

Systems for and methods of determining statistical metrics such as variances are taught in U.S. patent application Ser. No. 11/060,846, titled "Dynamic Finger Detection Mechanism for a Fingerprint Sensor," and filed Feb. 18, 2005, which is hereby incorporated by reference.

These metrics are powerful discriminants when used together. Pores are difficult to create on fake materials; however not all pores image well on all fingerprint sensors, especially low-resolution fingerprint sensors. Play Doh® and gelatin tend to image rather darkly on the fingerprint sensor used in the preferred embodiment, with high automatic gain control settings; however many real fingers exhibit such dark ridges and high gain control settings. Streaking is a phenomenon that does not seem to occur with the non-human materials tested, and would be difficult to cause in certain hydrophobic materials; however, many real fingers do not show artifacts related to streaking. So while each metric used may not be ideal by itself, in combination with the others the system can be made to be quite reliable. Simply testing whether a metric is within a specific range would not work very well with any of the above metrics.

Those skilled in the art will recognize how to calculate metrics involving average and variance of ridge and valley pixels (450A through 450D). Fingerprint process logic (e.g., 140, FIG. 1) typically contains an image binarization step that identifies which image pixels are part of ridges (typically labeled black) and which are part of valleys (typically labeled white). Such algorithms are well known to those skilled in the art. An example is given in Maltoni, D., Maio, D., Jain, A. K., Prabhakar, S., Handbook of Fingerprint Recognition, Chapter 5, such as at pages 95-97, which is hereby incorporated by reference.

Figure 5A:
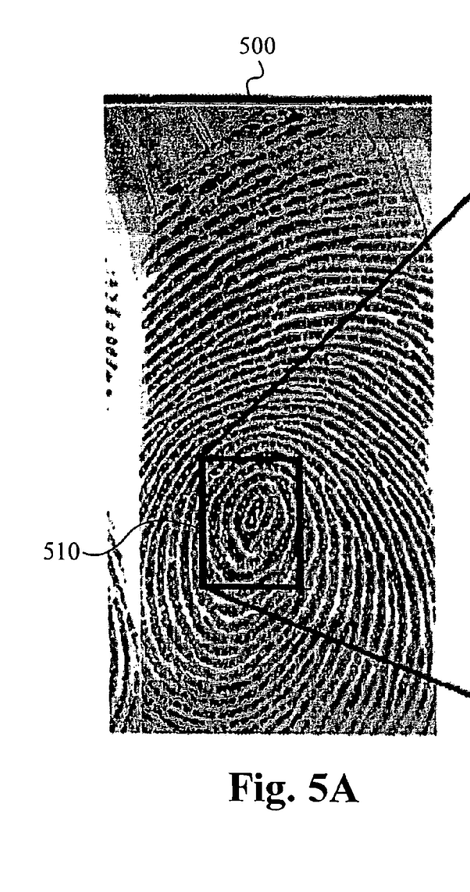
FIGS. 5A and 5B show, respectively, a fingerprint image and an enlargement of the fingerprint image with visible pores circled, used to detect the similarity of a finger to human skin in accordance with the present invention.
Figure 5B:
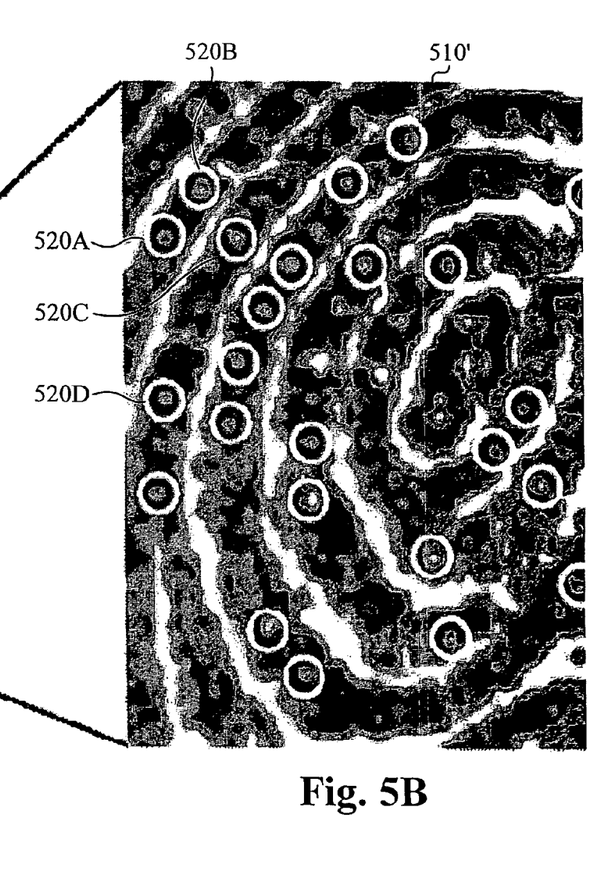

Sweat pore density (450E) requires first detecting the visible pores along the ridges, then calculating density by simply dividing the total number of pore pixels by the total number of rows in the full fingerprint image. FIG. 5A shows a fingerprint image 500 containing a section 510. FIG. 5B is a magnified view of the section 510, showing visible pores circled 520A-520D. In the preferred embodiment, the pores are detected by examining known ridge pixels and looking for pixels that are much lighter than their neighboring pixels. In one embodiment, a pixel is declared a pore pixel when it is much lighter than all of its 8 closest neighbors. In alternative embodiments, more sophisticated methods of pore detection are used, including image template matching and morphological techniques such as image erosion and dilation. Different image resolutions may require slightly different algorithms to reliably detect the pore pixels. Alternative embodiments count the actual number of pores instead of pore pixels.

Figure 6A:
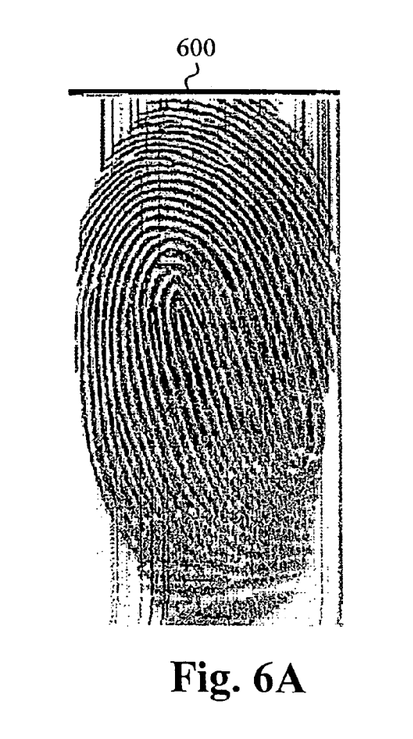
FIG. 6A shows fingerprint image data corresponding to streaks from pore leakage during a finger swipe, used to detect the similarity of a finger to human skin in accordance with the present invention.
Figure 6B:
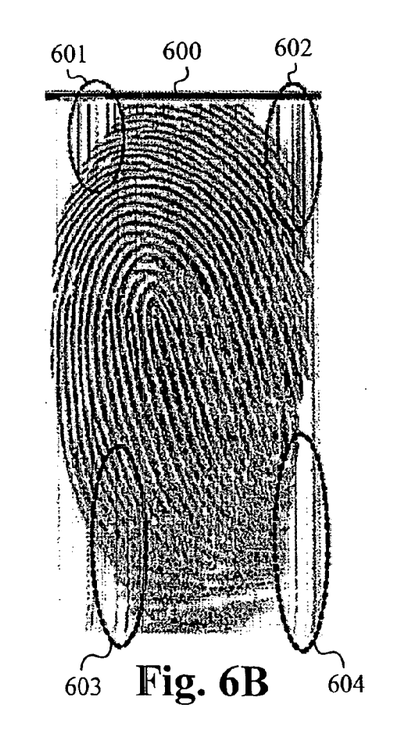
FIG. 6B shows the image of FIG. 6A, with those portions containing pixel streaks highlighted.
Figure 6C:
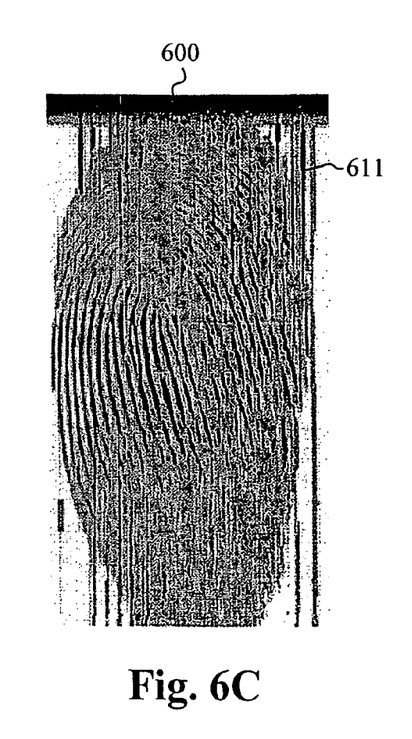
FIG. 6C shows the image of FIG. 6B, after processing using a streak pixel detection algorithm in accordance with the present invention.

The density of finger image streaks can be calculated using standard techniques known to those skilled in the art of image processing. FIGS. 6A-C are used to illustrate streaks captured using a fingerprint sensor. FIG. 6A shows a fingerprint image 600. FIG. 6B shows the fingerprint image 600 with streaks shown in the ovals 601-604. FIG. 6C shows the fingerprint image 600 with more pronounced streaking, shown by the exemplary streak line 611.

Figure 7:
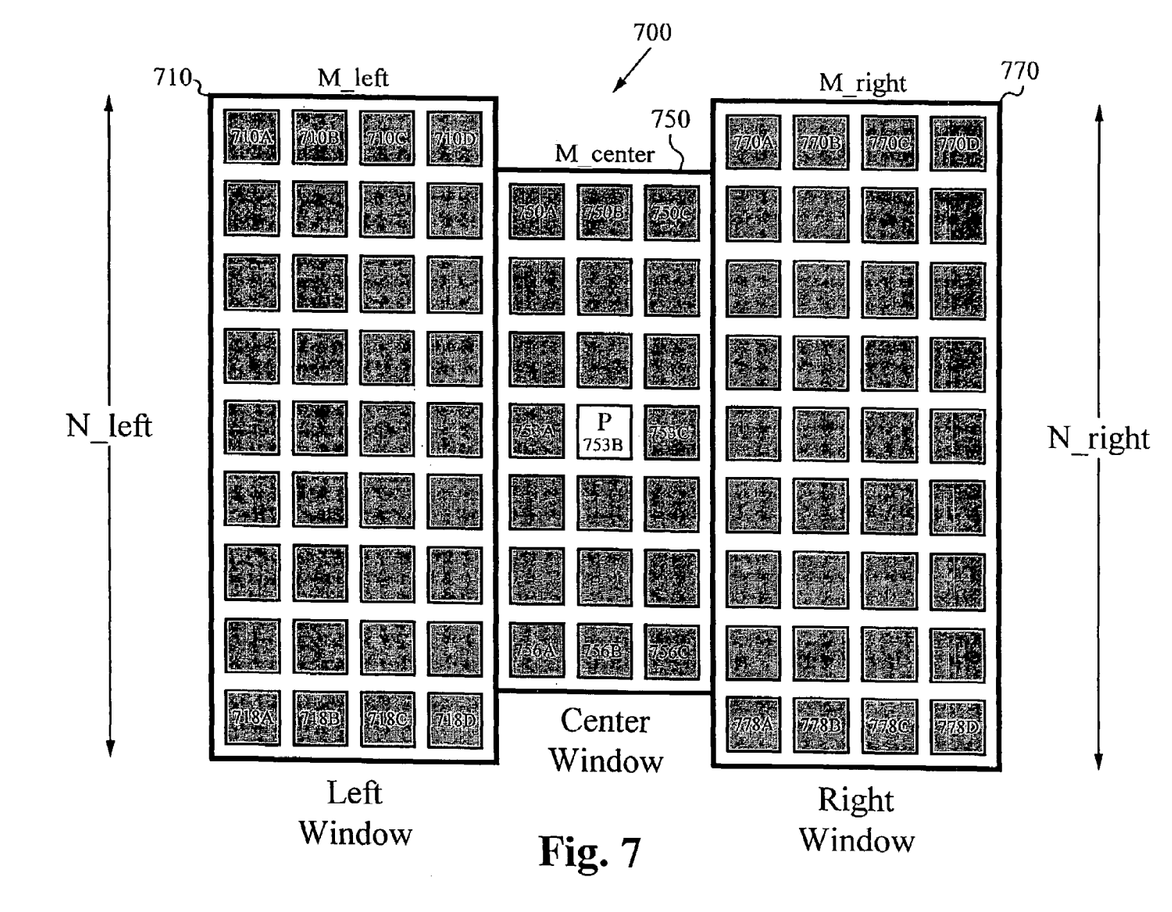
FIG. 7 shows windows used to detect streaking due to sweat pore leakage in accordance with the present invention.

In a preferred embodiment, a filter is passed over the fingerprint image, pixel-by-pixel, to detect the streaks. The filter looks in three windows: one window to the left of the pixel P under test, one to the right of the pixel, and one centered around the pixel. FIG. 7 shows an exemplary 3-window filter 700 in accordance with the present invention. A first window 710 has dimensions N_left×M_left, a second window 750 has dimensions N_center×M_center, and a third window 770 has dimensions N_right×M_right. The window 710 has 9 rows of panes (e.g., overlying the sensed elements), with exemplary panes in the first row labeled 710A-D and in the ninth row labeled 718A-D. The window 750 has 7 rows of panes, with exemplary panes in the first row labeled 750A-D and in the seventh row labeled 756A-D. The window 770 has 9 rows of panes, with exemplary panes in the first row labeled 770A-D and in the ninth row labeled 778A-D. A pixel P in the window 750 is declared to be part of a streak if the average pixel value in the window 750 is significantly higher than the average pixel value in the left 710 and right 770 windows. That is, W_avg_center>W_avg_left+T AND W_avg_center>W_avg_right+T.

In a preferred embodiment, N_left=N_center=N_right=16, M_left=M_center=M_right=3, and T is set such that the center average must be 50% higher than the averages in each side window. However, other dimensions and thresholds can be used to tradeoff detection sensitivity with computational efficiency. Asymmetrical and/or non-rectangular and/or non-contiguous windows are other options that could be advantageous in some embodiments. In one embodiment, the dimensions of the windows 710, 750, and 770 are programmable. In another embodiment, the dimensions are changed so that a neural network "learns" the dimensions that most accurately determine spoof probabilities in accordance with the present invention.

The raw signal level of the applied stimulus (e.g., a real or fake finger) is useful to determine how weak or strong the sensed signal is. A preferred embodiment uses the median automatic gain control (AGC) of the Atrua ATW210 or ATW212 sensor. This value is readily available for reading from the sensing hardware itself. This sensor is capable of adjusting its AGC value depending on the amount of bulk capacitance in close proximity to its sensing array. Since most sensors do not provide this metric, alternative embodiments must substitute the average gray level of the overall image, or some other substitute reflective of the raw signal strength of the applied stimulus.

In alternative embodiments, variations of all or some of the above metric values could be used, including raw pore and streak pixel counts instead of or in addition to density calculations. In other alternative embodiments, the following metrics can be used to supplement or replace some or possibly all of the metrics used in the preferred embodiment:

Measures of finger elasticity based on the amount of deformation observed during the image capture. (Multiple image swipes could be required in different directions to improve the estimate.) Typical deformation is that the fingerprint ridges will appear further apart during pull swipes (due to stretching) and closer together during push swipes (due to compression). The amount can vary according to displacement from the center (core) of the fingerprint.

Electrical properties such as finger surface impedance (resistance, capacitance and inductance).

Optical properties such as color and reflectivity.

Vitality properties such as temperature, pulse, and blood oximetry.

Other embodiments of the invention are combined with supplemental biometric and non-biometric data. Examples of supplemental biometric data include a retinal scan or a scan of the sides of the fingerprint not likely to be available in a latent image. Examples of non-biometric data include user secrets such as a password or cryptographic key entered and stored during enrollment.

In the operation of one embodiment of the present invention, a user swipes his finger on a fingerprint sensor. Classifier logic determines a metric that classifies the captured fingerprint image data as belonging to a real or human finger because it contains a combination of other characteristics that together reliably indicate that the finger is real. Based on this classification, the user is verified or authorized and thus granted access, or he is denied access.

Some of the characteristics and their related metrics can be inherently dependent (e.g., streaks can be directly related to ridge elasticity, since they both can occur in humid environments) and thus can vary with one another. Alternatively, if the classifier logic includes a neural network, it can be taught to weigh metrics to more accurately predict whether a stimulus is real or fake.

It will be readily apparent to one skilled in the art that other modifications may be made to the embodiments without departing from the spirit and scope of the invention as defined by the appended claims.

I claim:

1. A biometric secured system comprising:
   a fingerprint sensor for capturing fingerprint image data; and
   a spoof detection module programmed to determine a spoof probability from a combination of metrics derived from the fingerprint image data, wherein the combination of metrics comprise any two or more of pixel gray level average and variance of pixels corresponding to a fingerprint ridge, pixel gray level average and variance of pixels corresponding to a fingerprint valley, density of sweat pores, density of streaks, and raw signal level.

2. The secured system of claim 1, wherein the spoof detection module comprises:
   a metric generator for generating the metrics; and
   classifier logic programmed to generate from the metrics a raw probability that the fingerprint image data was generated from a synthetic material.

3. The secured system of claim 1, wherein the combination of metrics further comprise values corresponding to any one or more of ridge elasticity of a fingerprint image, electrical properties of a fingerprint, optical properties of a fingerprint, and vitality properties of a fingerprint.

4. The secured system of claim 2, wherein the spoof detection module also comprises an adjustor programmed to adjust the raw probability by a base probability to generate the spoof probability.

5. The secured system of claim 4, wherein the base probability is generated from stored metrics.

6. The secured system of claim 5, wherein the stored metrics are based on fingerprint image data captured during an enrollment step.

7. The secured system of claim 2, wherein the spoof detection module also comprises a filter for dividing the fingerprint sensor into multiple windows, and the classifier logic is also programmed to determine the spoof probability based on a comparison of the values of the metric in each of the multiple windows.

8. The secured system of claim 7, wherein dimensions of each of the windows are programmable.

9. The secured system of claim 2, wherein the classifier logic comprises a neural network for learning to generate the raw probability from the combination of metrics.

10. The secured system of claim 1, wherein the fingerprint sensor comprises a swipe sensor.

11. The secured system of claim 1, wherein the fingerprint sensor comprises a placement sensor.

12. The secured system of claim 1, further comprising an access module for granting access to a host system when the spoof probability is within a predetermined range.

13. The secured system of claim 12, further comprising a host system coupled to the access module.

14. The secured system of claim 13, wherein the host system comprises any one of a cell phone, a personal digital assistant, a digital camera, and a personal computer.

15. The secured system of claim 5, further comprising a storage for storing the stored metrics.

16. The secured system of claim 15, wherein the storage is coupled to the spoof detection module over a network.

17. The secured system of claim 5, wherein the stored metrics are encrypted.

18. A spoof detection module comprising a computer readable medium having computer readable program logic recorded thereon for controlling a processor, the logic comprising:
 a metric calculator programmed to receive fingerprint image data and calculate a combination of multiple metrics; and
 classifier logic programmed to receive the multiple metrics and determine a spoof probability based on the combination of the multiple metrics, wherein the multiple metrics comprise any two or more of pixel gray level average and variance of pixels corresponding to a fingerprint ridge, pixel gray level average and variance of pixels corresponding to a fingerprint valley, density of sweat pores. density of streaks, and raw signal level.

19. The spoof detection module of claim 18, wherein the multiple metrics further comprise values corresponding to any one or more of ridge elasticity of a fingerprint, electrical properties of a fingerprint, optical properties of a fingerprint, and vitality properties of a fingerprint.

20. The spoof detection module of claim 18, wherein at least two of the multiple metrics are interdependent.

21. The spoof detection module of claim 18, further comprising a probability adjustor programmed to receive the spoof probability and adjust it based on stored fingerprint data to generate an adjusted spoof probability.

22. The spoof detection module of claim 18, further comprising a filter for dividing the fingerprint sensor into multiple windows, wherein the classifier logic is also programmed to determine the spoof probability based on a comparison of the values of the metric in each of the multiple windows.

23. The spoof detection module of claim 22, wherein dimensions of each of the windows is programmable.

24. The spoof detection module of claim 18, wherein the classifier logic comprises a neural network for learning to generate the spoof probability from the multiple metrics.

25. The spoof detection module of claim 18, wherein the fingerprint image data corresponds to data captured using a fingerprint swipe sensor.

26. The spoof detection module of claim 18, wherein the fingerprint image data corresponds to data captured using a fingerprint placement sensor.

27. A method of determining the similarity of a finger to human skin, comprising:
 capturing fingerprint image data; and
 determining a spoof probability that the finger is real based on a combination of metrics derived from the fingerprint image data, wherein the combination of metrics comprise any two or more of pixel gray level average and variance of pixels corresponding to a fingerprint ridge, pixel gray level average and variance of pixels corresponding to a fingerprint valley, density of sweat pores, density of streaks, and raw signal level.

28. The method of claim 27, wherein the combination of metrics further includes density of streaks, the method further comprising dividing the fingerprint image data into multiple windows, wherein the spoof probability is based on a comparison of the values of the metric in each of the multiple windows.

29. The method of claim 27, wherein the combination of metrics further comprise values corresponding to any one or more of ridge elasticity of a fingerprint, electrical properties of a finger, optical properties of a finger, and vitality properties of a finger.

30. The method of claim 27, wherein at least two of the metrics from the combination of metrics are interdependent.

31. The method of claim 27, further comprising adjusting the spoof probability using fingerprint image data captured during an enrollment step.

32. The method of claim 31, further comprising encrypting the fingerprint image data captured during the enrollment step.

33. The method of claim 31, further comprising determining the spoof probability at a first location and storing the fingerprint image data captured during an enrollment step at a second location, wherein the first location and the second location are coupled over a network.

34. The method of claim 27, further comprising using a neural network for learning to compute the spoof probability from the multiple metrics.

35. The method of claim 27, wherein the fingerprint image data is captured using a swipe sensor.

36. The method of claim 27, wherein the fingerprint image data is captured using a placement sensor.

37. The method of claim 27, wherein a threshold for the spoof probability depends on a level of a transaction.

38. The spoof detection module of claim 18, wherein the computer readable program logic comprises at least one of computer instructions and application-specific integrated circuits.

* * * * *